3,384,548
DEPILATORY COMPOSITIONS

Charles Zviak, Franconville, and Jean Rouet, Le Blanc-Mesnil, France, assignors to Société anonyme dite l'Oreal, a corporation of France
No Drawing. Filed Mar. 16, 1964, Ser. No. 352,301
Claims priority, application France, Mar. 19, 1963, 928,549
1 Claim. (Cl. 167—89)

This invention relates to dipilatory compositions.

The depilatory activity of certain alkaline metallic sulphides, more especially sodium, strontium and barium sulphides, is well known. However, these products liberate hydrogen sulphide in use and produce an irritant action if the time of application is at all prolonged.

In order to lessen this disadvantage, it has been proposed to use alkaline earth metal salts, e.g. the calcium or strontium salts, of mercapto-carboxylic acids. In order to obtain depilation in commercially acceptable times, i.e. in less than about 10 minutes, it is necessary to use these salts at a pH higher than 12, but at these pH values, they all can give rise to irritation if the time of application is prolonged. Moreover, these alkaline earth salts are sparingly soluble in water, as also are the alkaline earth metal hydroxides, and it is therefore impossible to obtain depilatory compositions containing them in the form of solutions or gels. In addition, these salts are liable to absorb carbon dioxide from the air with formation of the very insoluble alkaline earth metal carbonates.

It is known that the depilatory activity of sodium and potassium mercaptocarboxylates is higher than that of the corresponding alkaline earth metal salts, but these substances are too irritant to be used on human beings without danger.

It has now been found that compositions containing mercaptocarboxylic anions and lithium cations can be used as depilatory agents without any of the aforesaid disadvantages.

The present invention accordingly provides depilatory compositions comprising lithium cations and anions of a mercaptocarboxylic acid and having a pH of 13 or less.

Lithium mercaptocarboxylates have neither the unpleasant odour nor the irritating effect of alkali metal sulphides. They are also more effective, at a given concentration and pH value, than the corresponding alkaline earth metal salts, so that they may be used in a lower concentration or at a lower pH value, so that the risk of irriation is reduced. In addition, they have not the irritant action of the corresponding sodium or potassium salts and have sufficient solubility in water to enable depilatory compositions to be prepared in the form of solutions, gels or foams.

Any mercaptocarboxylic acid can be used in the compositions of the invention, but thioglycollic acid, and α- and β-mercaptopropionic acids are preferably employed.

Preferably the quantity of mercaptocarboxylic acid present in the compositions is between 0.3 and 1.0 gram-ion per litre and the quantity of lithium is at least 0.6 gram-ion per litre. Since the lithium ions are ordinarily added as lithium hydroxide the maximum quantity of lithium is generally determined by the upper pH limit of 13 and depends on the other constituents of the compositions, especially the mercaptocarboxylic acid. A practical maximum is about 2.2 gram-ions of lithium per litre.

The preferred pH of the depilatory compositions is between 11 and 12.5.

In addition to the usual adjuvants such as wetting agents, the new compositions may contain water-insoluble alkaline earth metal salts, and preferably calcium carbonate.

The compositions may also contain, as swelling agents for hair, urea, thiourea, melamine, guanidine or an alkali metal thiocyanate.

According to the invention, the depilatory compositions comprising lithium salts can be packed with a suitable propellant in aerosol containers allowing the distribution of the depilatory cream in the form of a foam, which is much more easy to smear on the skin and is more economical to use than a non-foaming cream.

The propellant used for this aerosol packing must of course, be inert as regard the mercaptocarboxylic acids, the lithium salts and the swelling agents present in the composition.

The following tables show the advantageous properties of lithium mercaptocarboxylates as compared with those of related salts. Table I shows by way of comparison the depilatory activity and the effect on skin of various salts of mercaptocarboxylic acids. Table II shows the solubilities of the hydroxides, carbonates, thioglycollates and α-mercaptopropionates of calcium, strontium and lithium.

TABLE I.—COMPARED ACTIVITY OF VARIOUS SALTS OF MERCAPTOCARBOXYLIC ACIDS

[mercaptocarboxalate concentration=0.4 M, pH=12.5]

| Cation | Thioglycollic acid | | α-Mercaptopropionic acid | |
|---|---|---|---|---|
| | Depilation time in minutes | Effect on the skin | Depilation time in minutes | Effect on the skin |
| Ca | 7 | 0 | 10 | 0 |
| Ba | 12 | 0 | 7 | 0 |
| Sr | 5 | 0 | 7 | 0 |
| Na | 4 | + | 5½ | + |
| K | 3½ | + | 4 | ++ |
| Li | 3½ | 0 | 5 | 0 |

In this table, 0 means that there is no irritation, + means that there is irritation, ++ means that there is strong irritation.

In addition, it should be noted that barium salts are toxic.

TABLE II.—SOLUBILITIES OF THE HYDROXIDES, THIOGLYCOLLATES, α-MERCAPTOPROPIONATES AND CARBONATES OF THE ALKALINE EARTH METALS AND LITHIUM AT pH=12.0

| Cation | Hydroxide, percent | Thioglycollate, M | α-Mercapto-propionate, M | Carbonate, percent |
|---|---|---|---|---|
| Ca | 0.18 | 0.35 | 0.3 | 0.001 |
| Sr | 0.4 | 0.45 | 1 | 0.001 |
| Li | 12.7 | 0.9 | 1.04 | 1.3 |

The following examples illustrate the invention.

EXAMPLE 1

The following composition is prepared:

| | G. |
|---|---|
| Calcium carbonate | 25 |
| Sipol AO wax | 4 |
| Thioglycollic acid | 5 |
| Lithium hydroxide | 1.4 |

Water to 100 cc.

The pH is brought to 12 by the addition of further lithium hydroxide.

An excellent depilatory cream is thus obtained.

EXAMPLE 2

The following composition is prepared:

| | G. |
|---|---|
| Calcium carbonate | 22 |
| Cetyl alcohol hydroxyethylenated with 10 mol. of ethylene oxide | 5 |
| α-Mercaptopropionic acid | 4 |
| Lithium hydroxide | 1 |
| Urea | 7.5 |

Water to 100 cc.

The pH is brought to 11.8 by the addition of a little calcium hydroxide.

There is thus obtained a cream having a good depilatory activity.

EXAMPLE 3

The following composition is prepared:

| | G. |
|---|---|
| β-Mercaptopropionic acid | 7 |
| Lithium hydroxide | 1.6 |
| Potassium thiocyanate | 4 |
| Lauryl alcohol hydroxyethylenated with 15 mol. of ethylene oxide | 0.2 |
| Water to 100 cc. | |

The pH is brought to 12.0 by the addition of further lithium hydroxide.

There is thus obtained a highly effective depilatory lotion.

EXAMPLE 4

The following composition is prepared:

| | G. |
|---|---|
| Thioglycollic acid | 6 |
| Lithium hydroxide | 1.6 |
| Hydroxyethylcellulose | 1 |
| Thiourea | 5 |
| Water to 100 cc. | |

The pH is brought to 12.0 by the addition of further lithium hydroxide.

A depilatory composition is thus obtained in the form of a liquid which is thick enough not to flow on application.

EXAMPLE 5

A depilatory cream having the following composition is prepared:

| | G. |
|---|---|
| Sipol AO wax | 3 |
| α-Mercaptopropionic acid | 8 |
| Lithium hydroxide | 1.8 |
| Urea | 4 |
| Thiourea | 2 |
| Melamine | 2 |
| Water to 100 cc. | |

The pH is brought to 12.0 by the addition of further lithium hydroxide.

The product is introduced into an aerosol pack in the following proportions:

| | Percent |
|---|---|
| Depilatory cream | 95 |
| Butane | 5 |

The product leaving the pack is a foam having good depilatory qualities.

What we claim is:

1. A process for removing hair from human skin comprising applying to the hair to be removed an effective amount of a depilatory composition comprising depilatory amounts of lithium cations and mercaptocarboxylic anions selected from the group consisting of thioglycollic, α-mercaptopropionic acid and β-mercaptopropionic acid, said composition having a pH value between about 11 and 12.5.

References Cited

UNITED STATES PATENTS

| 2,631,965 | 3/1953 | Schnell | 167—89 |
| 3,099,603 | 7/1963 | Banker et al. | 167—87.05 |

FOREIGN PATENTS

| 593,438 | 10/1947 | Great Britain. |
| 941,300 | 11/1963 | Great Britain. |
| 217,143 | 9/1958 | Australia. |

OTHER REFERENCES

American Druggist, vol, 137, No. 12, p. 96, June 16, 1958.

Sagarin, Cosmetics: Science and Technology, published by Interscience Publishers Inc., N.Y., 1957, pp. 468–469.

Schimmell Briefs No. 362, May 1965.

RICHARD L. HUFF, *Primary Examiner.*

L. GOTTS, *Examiner.*